United States Patent [19]

Schaumann

[11] 4,002,214
[45] Jan. 11, 1977

[54] DRILLING TOOL, ESPECIALLY FOR HAMMER DRILLS

[75] Inventor: Dietrich Schaumann, Weingarten, Germany

[73] Assignee: Hawera Probst Kommanditgesellschaft Hartmetall-Werkzeugfabrik Ravensburg, Ravensburg, Germany

[22] Filed: Apr. 23, 1975

[21] Appl. No.: 570,719

[30] Foreign Application Priority Data

Apr. 23, 1974 Germany .......................... 2419548

[52] U.S. Cl. ................................ 175/405; 175/320; 175/398; 403/343; 403/372
[51] Int. Cl.² ............................................ E21B 9/12
[58] Field of Search ......... 175/388, 389, 405, 383, 175/320, 404; 403/372, 343

[56] References Cited

UNITED STATES PATENTS

| | | | |
|---|---|---|---|
| 2,152,681 | 4/1939 | Caminez | 403/343 X |
| 2,418,418 | 4/1947 | Martin et al. | 403/343 X |
| 2,816,737 | 12/1957 | Kinard et al. | 175/386 |
| 3,062,568 | 11/1962 | Andresen et al. | 403/343 X |
| 3,690,390 | 9/1972 | Chromy | 175/405 |

*Primary Examiner*—Ernest R. Purser
*Assistant Examiner*—Richard E. Favreau
*Attorney, Agent, or Firm*—Walter Becker

[57] ABSTRACT

A boring tool, especially for drill hammers with a hollow drill core bit, in which the inner thread of the hollow drill core bit connected directly to the borer shank and in which a corresponding outer thread provided on a holding mandrel form a part of the borer shank have a wire coil-thread insert inserted therebetween. The hollow drill core bit and the borer shank are provided with centering surfaces located between the windings of the wire coil thread insert and arranged in centering engagement with each other.

17 Claims, 3 Drawing Figures

DRILLING TOOL, ESPECIALLY FOR HAMMER DRILLS

The present invention relates to drilling tools, especially for hammer drills, with a hollow bore core bit which by way of an inner thread is connected to a drill shank located in the drill axis, and in which preferably a centering drill is connected to the drill shank.

With a heretofore known drilling tool of the above mentioned type, the centering drill is, by means of a round thread provided in its rear shank end inserted into an inner thread at the front end of the drill shank, while the round thread projects beyond the front end of the drill shank and while upon said projecting section there is screwed on the hollow bore core bit by means of a corresponding inner thread. Due to the loads occurring during the drilling operation, there exists the possibility that the thread is knocked out; in such instance between the centering drill and the drill shank also the play of movement of the hollow bore core bit increases relative to the drill shank. The relative movements between the three parts above referred to bring about the formation of friction or fitting rust which result in high moments required for loosening the thread. The described thread connection also has the drawback that above all the first thread windings are under load, whereas the carrying proportion of the remaining thread flanks is low. Furthermore, the production of round threads is relatively difficult because if they are produced by chip removing operations, the steel for cutting the thread has to be precisely profiled on a profile projector. This is particularly the case for inner thread because outer thread can also be cut by rollers.

It is, therefore, an object of the present invention so to design a drilling tool that in a simple manner a safe and substantially play-free hold of the hollow bore core bit will be assured and the formation of friction and fitting rust will be avoided as far as possible.

These and other objects and advantages of the invention will appear more clearly from the following specification, in connection with the accompanying drawing, in which.

The drilling tool according to the present invention is characterized primarily in that the inner thread of the hollow bore core bit which is directly connected to the drill shank and a corresponding outer thread provided on a holding mandrel of the drill shank is engaged by a wire coil thread insert, and is furthermore characterized in that the hollow bore core bit and the drill shank adjacent to the spirals or helices of the wire coil thread insert with centering surfaces engage each other.

Wire coil-thread inserts have become known for connecting screws to nuts and the like. These designs are, however, not suitable for drilling tools according to the invention, inasmuch as the wire coil-thread insert itself does not assure a sufficient centering of the two parts which are screwed to each other so that these parts will have a play of movement relative to each other and that under a corresponding alternating load, easily friction and fitting rust forms. Furthermore, the play of movement, especially with threaded flanks which are located in axial section at an angle relative to each other brings about such high notch stresses that the threaded shaft will break after a relatively short time of use.

In contrast thereto, with the drilling tool according to the invention, the play of movement of the hollow bore core bit relative to the drill shaft is prevented by means of the centering surfaces which in a play-free manner engage each other with a press fit so that the described disadvantages are avoided in a simple manner. Due to this fact, the drilling tool according to the present invention is particularly suitable as a rock drill.

Figure 1:
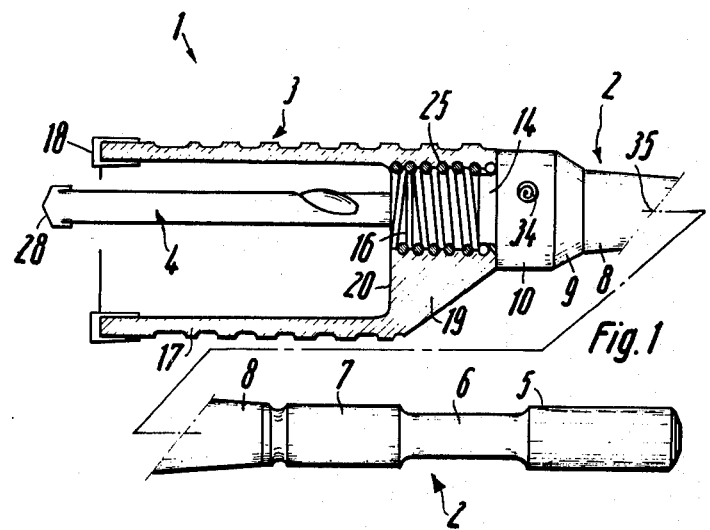
FIG. 1 illustrates an axial section through a drilling tool according to the invention, two different diameters for the core bit being shown.
Figure 2:
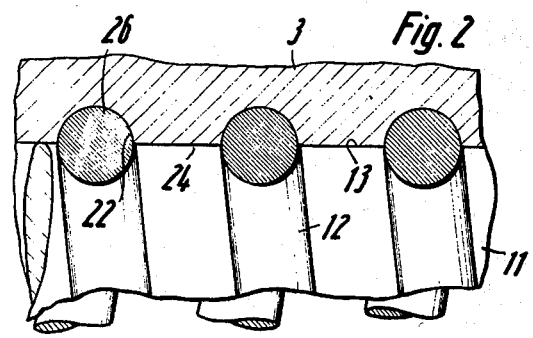
FIG. 2 is a cutout of FIG. 1, but on a larger scale than that of FIG. 1.
Figure 3:
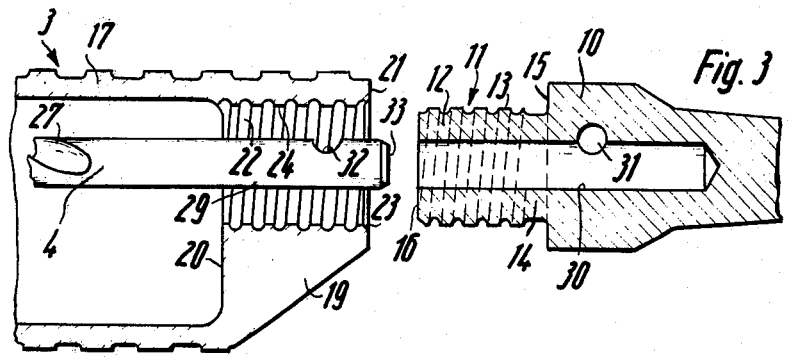
FIG. 3 shows in section and as an exploded view a cutout of the drill according to FIG. 1, while similar to FIG. 1 the upper half of the core bit has a shorter diameter than the lower section.

Referring now to the drawing in detail, FIGS. 1 to 3 illustrate a drilling tool 1 according to the invention which in FIG. 1 due to lack of space has been shown in two longitudinal sections arranged one above the other. The drilling tool 1 comprises a drill shank 2, a hollow bore core bit 3 directly connected to said drilling shank 2, and a centering drill 4 located in the bit 3. The centering drill 4 in independently of the bit 3 or in a contact-free manner relative thereto directly connected to the drill shank 2 so that the connection of these two parts with the drill shank 2 will in no way affect each other.

The drill shank 2 has at its rear end a serrated shaft section 5 for engagement with the drill head of a drilling machine, for instance, a hammer drill. This serrated shaft section 5 merges at its front end in one piece with a shank section 6 of reduced diameter and with a slightly reduced length. This shank section 6 is located between the serrated shaft section 5 and a cylindrical shank section 7 which has approximately the same diameter as the serrated shaft section 5, but has a length shorter than the latter. The front end of the shank section 7 merges through recess forming a circumferential groove with a shank section 8 that widens forwardly in an acute conical manner. The shank section 8 has approximately the same length as the serrated shaft section 5 and by means of a truncated cone-shaped intermediate section 9 merges with a collar 10 of a widened diameter. The collar 10 is substantially cylindrical and has a diameter which is approximately twice as long as that of the serrated shaft section 5. Provided on the front end face of collar 10 is a holding mandrel 11 which is substantially cylindrical and the outer diameter of which is approximately by one-third shorter than that of the collar 10. For purposes of obtaining a high strength, the serrated shaft section 5, the sections 6–9, the collar 10, and the holding mandrel 11 are designed as one single piece.

The holding mandrel 11 has its outer circumference provided with an outer thread 12. The threaded groove of said outer thread 12 is in axial section approximately semicircular. The outer surfaces of the holding mandrel 11 which are located between the spiral of the thread groove are located in a common cylindrical enveloping surface which is coaxial with the axis of the drill. Said outer surfaces of the holding mandrel 11 are provided as helical centering surface 13. the rear end of the holding mandrel 11 merges through a recess 14 designed in the manner of a circumferential groove with the front end face of the collar 10, which end face forms the front end face which extends at a right angle to the drill axis 35 and is designed as annular shoulder surface 15. The diameter of the recess 14 is slightly less than the core diameter of the outer thread 12 and the width of the recess 14 is approximately equal to the pitch of the outer thread 12. The length of the outer thread 12 which extends to the front free end face 16 of the holding mandrel 11 equals approximately the core diameter of this outer thread so that compact dimensions are obtained.

The hollow bore core bit 3 which with the illustrated embodiment differs in cross section from a circular shape, has a drill mantle 17 which is substantially symmetrical to the drill axis 35. Cutting elements 18 distributed over the circumference, are inserted into the front end of the drill mantle 17. The cutting edges 19 provided at the front end surfaces of said cutting elements 18 are located in a plane which is substantially rectangular to the drill axis 35. At the rear end, the hollow bore core bit 3 has a hub 19 which forms one piece with the core bit mantle 17. The front end face of said hub 19 forms a bottom surface 20 of the hollow chamber of the bit 3, which bottom surface extends at a right angle to the drill axis 35. The hub 19 is toward its rear end face 21 reduced approximately to the diameter of the collar 10 or the shoulder surface 15. Expediently, the diameter of the end face 21 is slightly greater than that of the shoulder surface 15. The length of the hub 19 is shorter than that of the holding mandrel 11 while expediently the length of the hub 19 corresponds to one quarter of the total length of the bit 3.

In a cylindrical bore which extends over the entire length of the hub 19 and is located in the drill axis 35, the bit 3 has an inner thread 22 which has the same pitch as the outer thread 12 and the thread grooves of which have the same cross sections as the thread grooves of the outer thread 12. The inner thread 22 extends approximately over the entire length of the bore up to the two end faces 20, 21 of the hub 19. That end of the bore which is adjacent the end face 21 is expediently provided with a counterbore or countersinking 23, the maximum diameter of which located in the end face 21 approximately equals the maximum diameter of the inner thread 22. Between the spiral of the threaded groove of the inner thread 22, the bore of the hub 19 forms a helical centering surface 24, the diameter of which is expediently so adapted to the diameter of the centering surface 13 that the two centering surfaces fit into each other with a play-free slide fit. Expediently, for the centering surface 13 one tolerance value, and for the centering surface 24 another tolerance value can be provided according to the German standards DIN.

The outer thread and the inner thread 22 are engaged by a common wire coil-thread insert 25 in a substantially play-free manner which thread insert 25 is helical and bent out of a wire. With the illustrated embodiment, the wire thread-coil insert is in a simple manner prepared from a radius-structural steel which has round or circular wire cross sections or is cylindrical. The depth of the threaded grooves of the outer thread 12 and of the inner thread 22 are of the same size so that the spirals 26 of the insert 25 in axial section extend to the same depth into the outer thread 12 and into the inner thread 22. The cross section of the threaded grooves is adapted to the wire cross section of said insert 25. Due to the described design, the drill shank 2 and the bit 3 are not only supported by the insert 25 but between the spirals 26 thereof are also supported relative to each other in a play-free manner by means of the centering surfaces 13, 24 so that a very safe hold is assured. This hold is furthermore improved by the fact that the centering surfaces 13, 24 in axial section merge approximately at an angle of 90° and at a sharp angle with the threaded grooves of the outer thread 12 or inner thread 22, in other words, due to the fact that the centering surfaces in axial section extend uninterruptedly between adjacent spirals 26 of the thread insert 25. It is, however, possible so to design the outer thread 12 and the inner thread 22 and/or the centering surfaces 13, 24 that they widen in the rearward direction in a conical manner. Due to the cylindrical design a particularly simple construction is obtained while in addition thereto the bit 3 with its rear end faces 21 can be safely clamped against the shoulder surface 15 of the drill shank. Furthermore, it is possible to provide the centering surfaces axially adjacent to the thread. Due to the illustrated design a particularly compact construction is obtained. Furthermore, it is possible to provide centering surfaces only within the region of those ends of the thread which face away from each other. However, by the centering surfaces extending over the entire length of the thread, a further improvement of the play-free connection can be realized.

Thread insert 25 extends over the front end surface 16 of the holding mandrel 11 or over the front end of the outer thread 12 so that the drill shank 2 will with safety up to its front end engage the wire coil-thread insert 25 which expediently extends to the bottom surface 20 of the bit 3. Relative to this bottom surface 20 there is offset the holding mandrel 11 with its front end surface 16 so that it is protected. The rear end of the insert 25 is offset toward the front relative to the rear end face 21 or the shoulder surface 15 by approximately the width of the recess 14 so that an upsetting of the wire coil insert thread 24 during the screwing-on of the bit 3 will be safely avoided.

The pitch of the thread insert 25 approximately equals the diameter of the wire cross section so that a favorable relationship in the size between the centering surfaces and the interengaging thread surfaces is obtained. For purposes of obtaining impact dimensions and a high strength of the drilling tool, the smallest wall thickness of hub 19 is selected approximately as equaling the wall thickness of the mantle 17.

It is, of course, to be understood that the present invention is, by no means, limited to the specific showing in the drawing, but also comprises any modifications within the scope of the appended claims.

What I claim is:

1. A boring tool, especially for drill hammers, which includes: a borer shank comprising in combination a holding mandrel provided with an outer thread and with an outer helical centering surface between the windings of said outer thread, a hollow drill core bit provided with an inner thread corresponding to said outer thread and together with the latter forming a helical passageway while having an inner helical centering surface located between the windings of said inner thread and in centering engagement with said outer helical centering surface, and a cylindrical wire coil-thread insert located in said helical passageway and firmly interconnecting said bit and said shank, said centering surfaces between said outer and said inner threads being cylindrical and being provided at least within the region of the ends of said wire coil thread insert, said helical centering surfaces extending in an uninterrupted manner between adjacent windings of said wire coil-thread insert.

2. A tool according to claim 1, which includes a centering borer connected to said shank and extending in axial direction thereof and of and through said hollow drill core bit.

3. A tool according to claim 1, in which the pitch of said wire coil-thread insert corresponds approximately to the diagonal measure of its wire cross section.

4. A tool in combination according to claim 1, in which said inner thread and said outer thread have approximately the same depth, and in which the centering surfaces in axial section merge at approximately 90° and at a sharp angle with said inner and outer threads.

5. A tool in combination according to claim 1, in which said centering surfaces extend approximately over the entire length of said holding mandrel.

6. A tool in combination according to claim 1, in which said centering surfaces are designed to fit each other with slight sliding fit.

7. A tool in combination according to claim 1, in which said wire coil-thread insert extends approximately up to that end of the inner thread which faces toward the working end of said borer, and in which the free end of said holding mandrel is set back by approximately one-third winding relative to that end of said inner thread which in assembled condition of said tool is closest to the working end of said bit.

8. A tool in combination according to claim 1, in which said wire coil-thread insert has a circular cross section.

9. A tool in combination according to claim 1, in which said wire coil-thread insert consists of radially formed steel.

10. A tool in combination according to claim 1, in which the length of the wire coil-thread insert corresponds substantially to the diameter of said inner and outer thread.

11. A tool in combination according to claim 1, in which said holding mandrel forms one single integral piece with said borer shank and forms the front end section thereof.

12. A tool in combination according to claim 1, in which said centering surfaces are designed to fit each other with press fit.

13. A tool in combination according to claim 1, in which said holding mandrel has that end thereof which is adjacent said shank provided with an annular groove having a diameter less than the core diameter of said outer thread.

14. A tool according to claim 13, in which the rear end of said wire coil-thread insert extends only up to said annular groove.

15. A tool in combination according to claim 1, in which the inner surface of said borer shank is provided with a shoulder surface, and in which said hollow drill core bit has its rear end surface in face to face engagement with said shoulder surface.

16. A tool in combination according to claim 15, in which said shoulder surface is located directly adjacent to the rear end of the holding mandrel, said holding mandrel having a shorter diameter than said shoulder surface.

17. A tool in combination according to claim 16, in which said annular shoulder surface forms the rear side surface of said annular groove.

* * * * *